United States Patent
Lin et al.

(10) Patent No.: US 7,978,278 B2
(45) Date of Patent: Jul. 12, 2011

(54) DISPLAY APPARATUS AND REPAIR METHOD THEREOF

(75) Inventors: Yi Tse Lin, Kaohsiung County (TW); Hsu Ho Wu, Tainan (TW); Chia Hua Yu, Taipei County (TW); Hui Fang Cheng, Tainan County (TW)

(73) Assignee: Hannstar Display Corporation, Taipei (TW)

( * ) Notice: Subject to any disclaimer, the term of this patent is extended or adjusted under 35 U.S.C. 154(b) by 377 days.

(21) Appl. No.: 12/252,857

(22) Filed: Oct. 16, 2008

(65) Prior Publication Data

US 2009/0102998 A1    Apr. 23, 2009

(30) Foreign Application Priority Data

Oct. 18, 2007 (TW) .................... 96138951 A

(51) Int. Cl.
*G02F 1/1333* (2006.01)
*G02F 1/1343* (2006.01)
*G02F 1/13* (2006.01)

(52) U.S. Cl. .................. 349/54; 349/55; 349/192
(58) Field of Classification Search .......... 349/54, 349/55, 192
See application file for complete search history.

(56) References Cited

U.S. PATENT DOCUMENTS

| | | | | |
|---|---|---|---|---|
| 5,132,819 A * | 7/1992 | Noriyama et al. | ............. | 349/55 |
| 5,600,460 A * | 2/1997 | Yamamoto et al. | ............. | 349/54 |
| 5,859,679 A * | 1/1999 | Song | ............. | 349/54 |
| 6,680,770 B1* | 1/2004 | Nagase | ............. | 349/139 |
| 6,714,269 B1* | 3/2004 | Huang | ............. | 349/54 |
| 2007/0285594 A1* | 12/2007 | Kang et al. | ............. | 349/54 |

FOREIGN PATENT DOCUMENTS

CN     1877399 A     12/2006

OTHER PUBLICATIONS

Office Action dated Jul. 15, 2010 for 200710192873.7, which is a Chinese counterpart application, that cites CN1877399A.

* cited by examiner

*Primary Examiner* — Mike Qi
(74) *Attorney, Agent, or Firm* — WPAT, P.C.; Anthony King

(57) ABSTRACT

A display apparatus comprises a substrate, a first lead, a second lead and a third lead. The first lead and second lead are provided on the substrate and intersect at a first overlapping area. The third lead surrounds the first overlapping area where the first lead and second lead cross each other. The third lead intersects the first lead respectively at a second overlapping area and a third overlapping area.

20 Claims, 6 Drawing Sheets

DISPLAY APPARATUS AND REPAIR METHOD THEREOF

BACKGROUND OF THE INVENTION (A) Field of the Invention

The present invention relates to a display apparatus and repair method thereof, and more particularly, to a liquid crystal display (LCD) device with a repairable structure.

(B) Description of the Related Art

A conventional LCD device comprises an array substrate with a plurality of pixel electrodes, a color filter substrate with a common electrode and a liquid crystal material sandwiched between the two substrates. When voltages are applied to a pixel electrode and the common electrode, the molecules of the liquid crystal material can rotate because a difference between the voltages of the pixel electrode and the common electrode is changed. The plurality of the pixel electrodes are respectively arranged in a pixel array, and are respectively connected to a thin film transistor (TFT) device. The TFT device can be activated by a gate signal on a gate line, and optionally transmits data voltage from a data line.

FIG. 1 is a diagram of an equivalent circuit of a conventional LCD device. An LCD device 10 comprises a plurality of data lines 121-12n and a plurality of scan lines 111-11m. There are a plurality of pixels 13 placed at the intersections of the data lines 121-12n and scan lines 111-11m. Each of the pixels 13 comprises a thin film transistor 131 and a liquid crystal (LC) capacitor 133 controlling the rotation of the LC molecules. The thin film transistor 131 is activated or inactivated by a scan line 112.

As shown in FIG. 1, there are a plurality of intersections of the scan line 112 and data lines 121-12n, such as those marked A and B. If metal particles are inadvertently left in the intersections during the manufacturing processes, the scan line 112 could be shorted to data lines 121-12n. An open circuit is likely to occur at the intersections of the scan line 112 and data lines 121-12n due to circuit pattern loss. Therefore, signals cannot be transmitted to the next pixel because of the open circuit.

In the conventional arts, the defects of the aforesaid display apparatus can be repaired by laser welding, laser cutting, etc. However, because the display apparatus lacks adequate repairable structure or circuit, the repair processes are very complicated and require much time to complete. The circuit structure of the current display apparatus needs to be improved so that the aforesaid problems of defect repair can be resolved.

SUMMARY OF THE INVENTION

The present invention provides a display apparatus and a repair method thereof. Third leads with a repair function are provided on the insertions of conductive lines. When short or open circuits are inserted, such defects can be easily repaired through the third leads. Accordingly, the repairable rate of the circuits is improved, and the working time of repair operation is significantly reduced.

According to the aforesaid aspects, the present invention provides a display apparatus comprising a substrate, a first lead, a second lead and a third lead. The first lead and second lead are provided on the substrate and intersect at a first overlapping area. The third lead surrounds the first overlapping area where the first lead and second lead cross each other. The third lead intersects the first lead at a second overlapping area and a third overlapping area.

The present invention provides a repair method for a display apparatus. The method applied to the display apparatus of Claim 1 comprises the following steps of: electrically isolating the portion of first lead corresponding to the second overlapping area and the third overlapping area; electrically connecting the portion of the third lead corresponding to the second overlapping area to the portion of the first lead corresponding to the second overlapping area; and electrically connecting the portion of the third lead corresponding to the third overlapping area to the portion of the first lead corresponding to the second overlapping area, whereby the portions of the first lead corresponding to the second overlapping area and third overlapping area electrically connect each other through the third lead.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

The following will demonstrate the present invention using the accompanying drawings to clearly present the characteristics of the technology.

Figure 1:
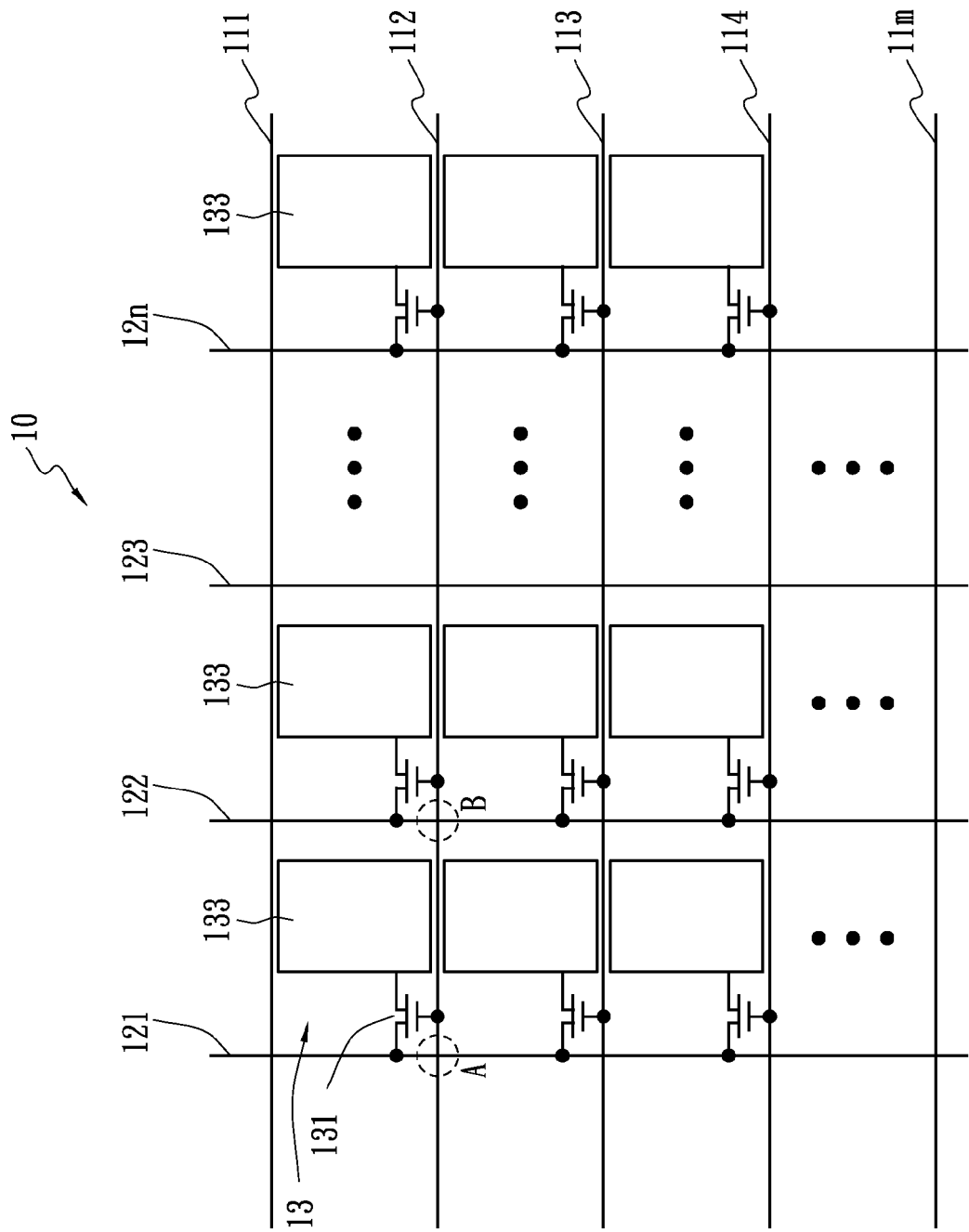
FIG. 1 is an equivalent circuit of a conventional display apparatus.
Figure 2:
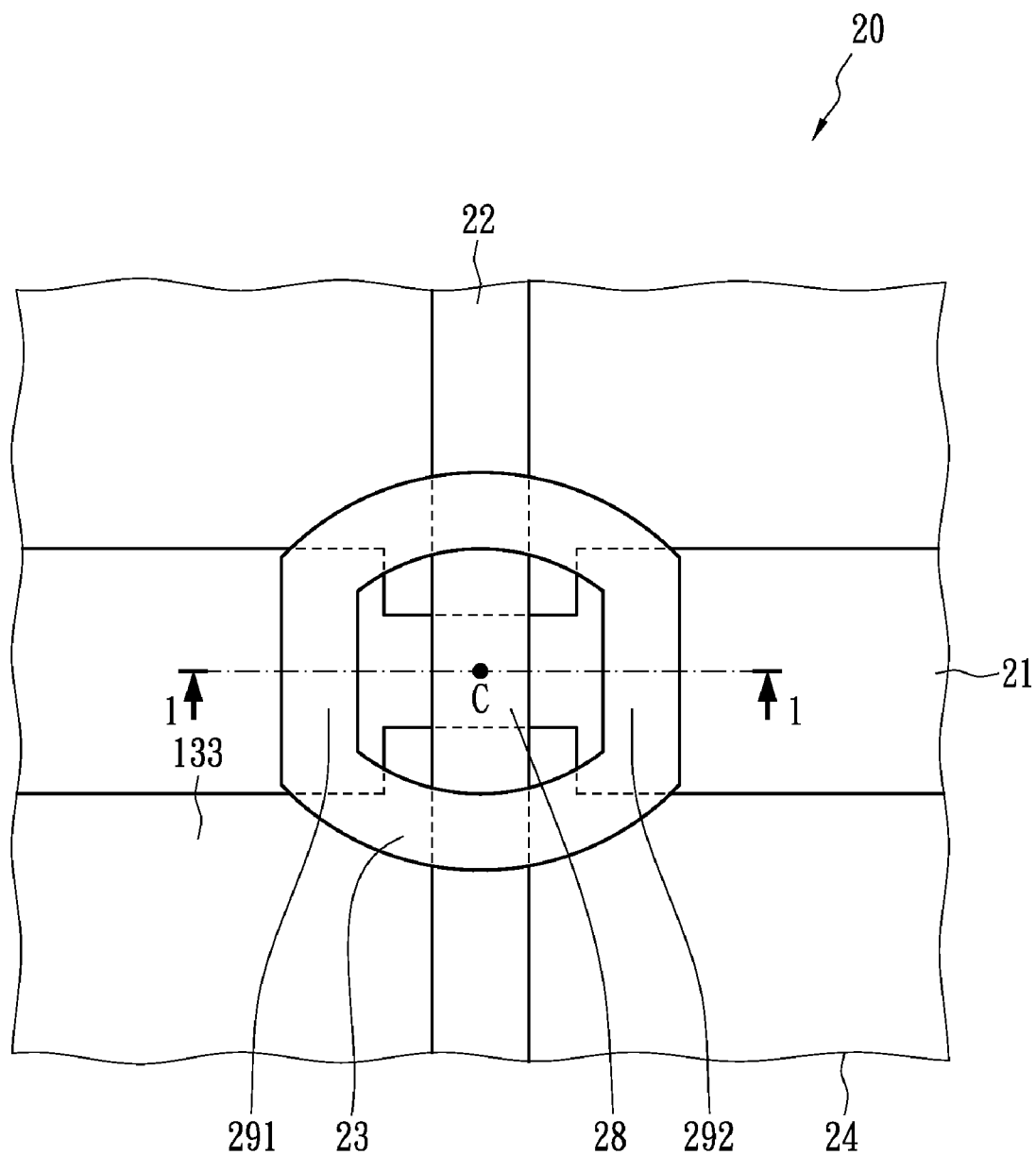
FIG. 2 is a schematic diagram of a structure of a repairable intersection circuit.

FIG. 2 is a schematic diagram of a structure of a repairable intersection circuit. The structure 20 of a repairable intersection circuit is provided on a display apparatus, and comprises a substrate 24, a first lead 21, a second lead 22 and a third lead 23. The first lead 21 and second lead 22 are provided on the substrate 24 and intersect each other at a first overlapping area 28. The third lead 23 surrounds the first overlapping area 21 where the first lead 21 and second lead 22 cross each other. The third lead 23 intersects the first lead 21 respectively at a second overlapping area 291 and a third overlapping area 292. As shown in FIG. 2, the third lead 23 is a closed, ring-shaped lead. The material of the third lead 23 is a transparent metal oxide such as an Indium Tin oxide. The width of the portion of the first lead 21 at the first overlapping area 28 is smaller that of other portions of the first lead 21 (at two sides of the first overlapping area 28).

The aforesaid embodiment of the present invention are intended to be illustrative only, and does not limit the scope of the present invention. That is, the second overlapping area and third overlapping area can be also redefined as some areas of the second lead 22 where the third lead 23 intersects the second lead 22. Similarly, the first lead can also redefined as a longitudinal lead, and the second lead can also redefined as a transverse lead in another embodiment.

Figure 3A:
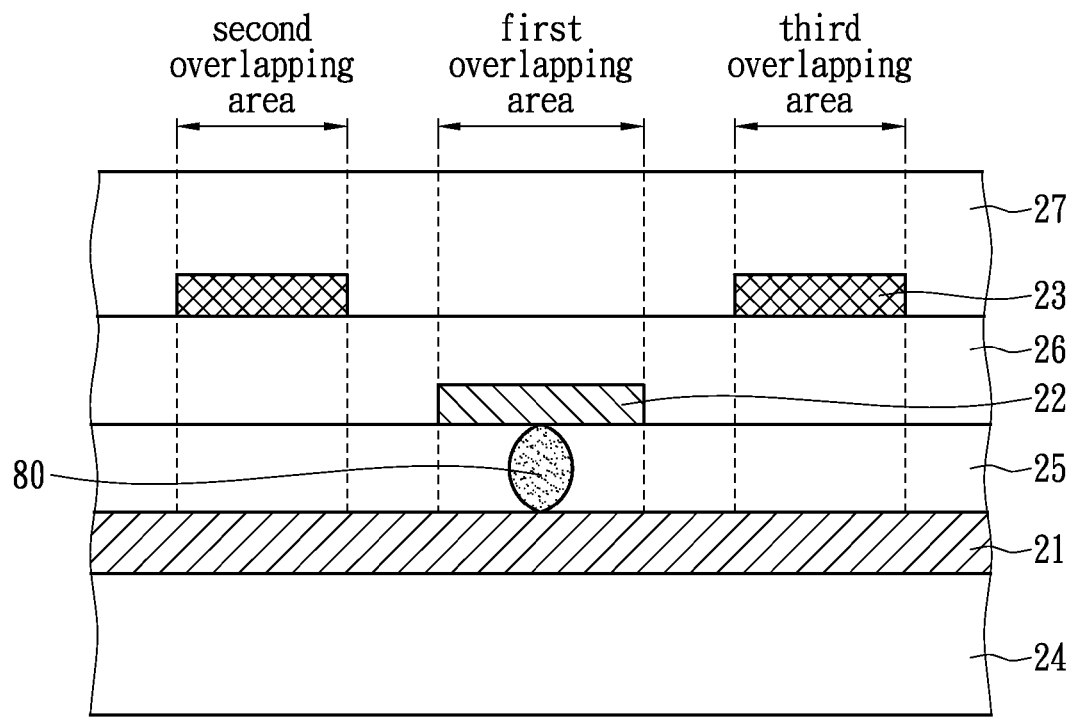
FIGS. 3(a)-3(b) are cross-sectional diagrams taken along line 1-1 in FIG. 2.

FIG. 3(a) is a cross-sectional diagram taken along line 1-1 in FIG. 2. The first lead 21, second lead 22 and third lead 23 are provided on the substrate 24. Insulation materials 25 and 26 separate the first lead 21, second lead 22 and third lead 23 from each other, and an insulation material 27 overlays the third lead 23. When a metal particle 80 exists in the point C of the first overlapping area 28 as shown in FIG. 2, it is likely to cause the short of the first lead 21 and second lead 22. The metal particle 80 could be external dust that improperly remains thereon during the processes of the display apparatus.

Figure 3B:
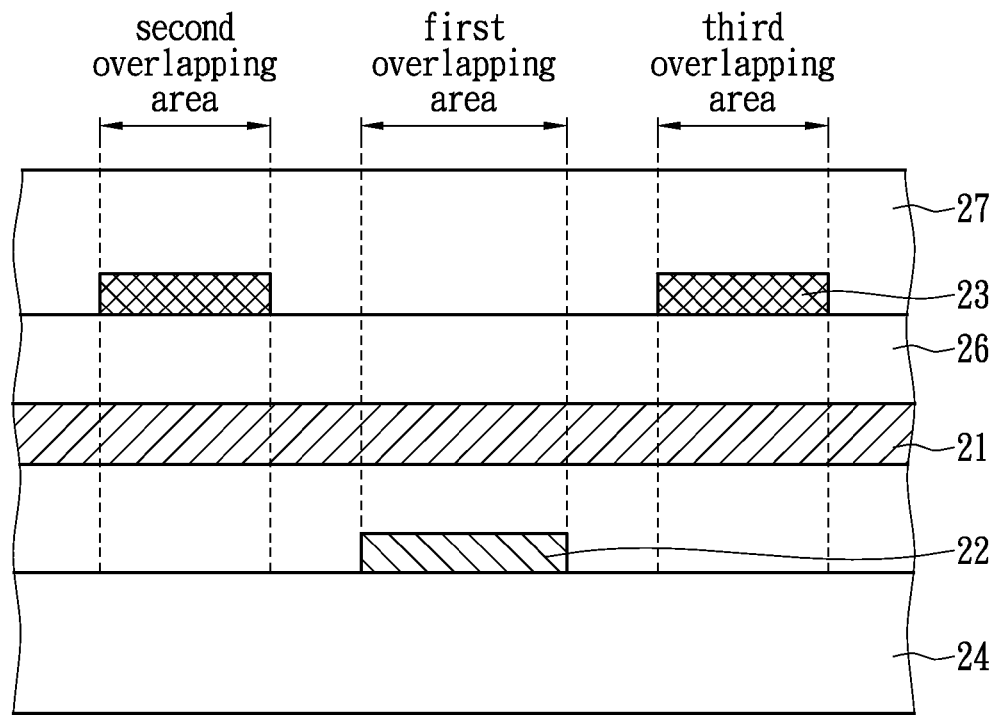

In comparison with FIG. 3(a), as shown in FIG. 3(b), the second lead 22 is formed on the substrate 24. Subsequently, the insulation material 25 and first lead 21 are formed on the first lead 22. This structure and similar structures are within the subject matter claimed by the present invention.

Figure 4:
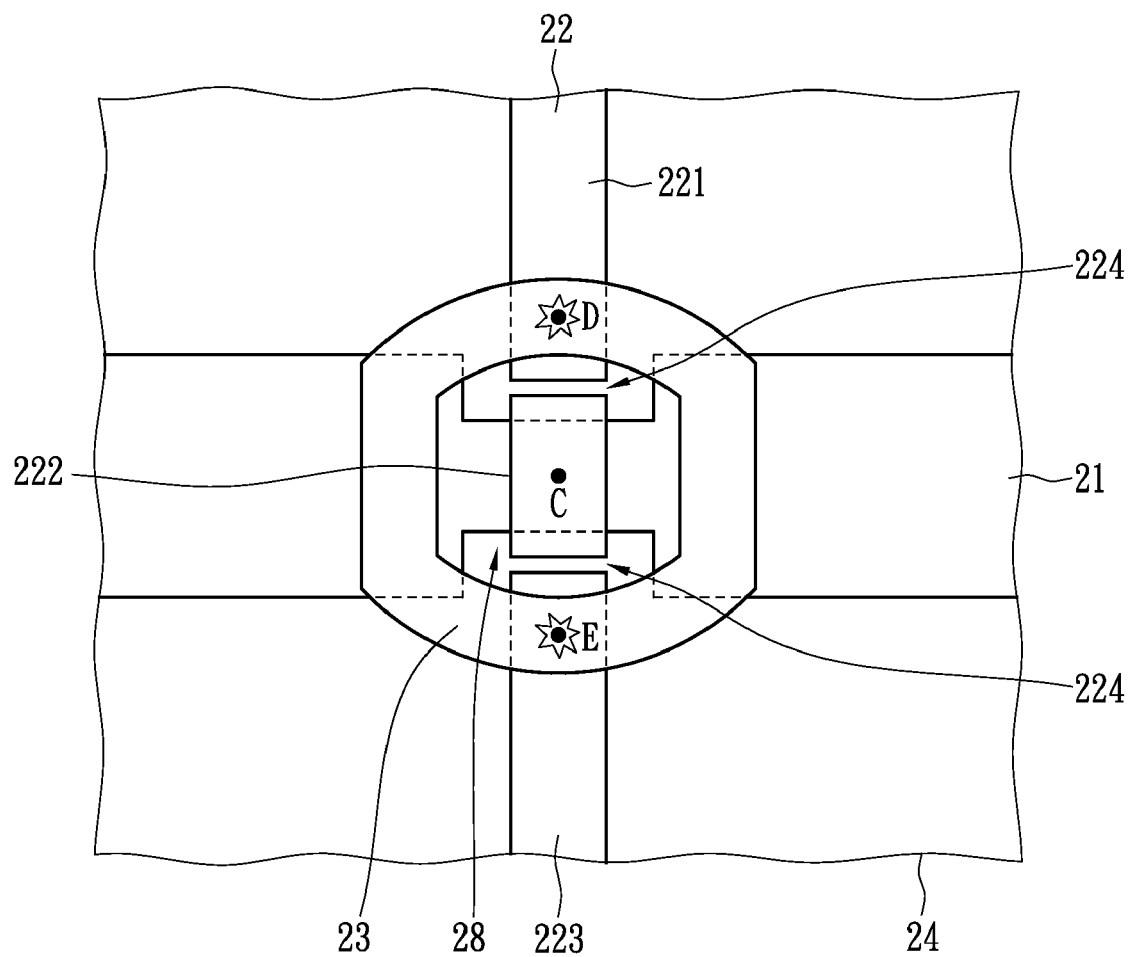
FIG. 4 is a schematic diagram showing repairs on a short defect through the third lead in accordance with the present invention.

The third lead 23 of the present invention can precisely resolve the aforesaid problem, as shown in FIG. 4. The inner portions of the second lead 22 adjacent to the third lead 23 are cut by laser so that two slots 224 are formed. The second lead 222 at the overlapping area is thereby isolated from the second leads 221 and 223. Subsequently, laser welding is applied to the point D and E of the third lead 23 in this figure, and the third lead 23 connects the second leads 221 and 223 to form a loop. Consequently, such a short defect can be repaired.

Figure 5:
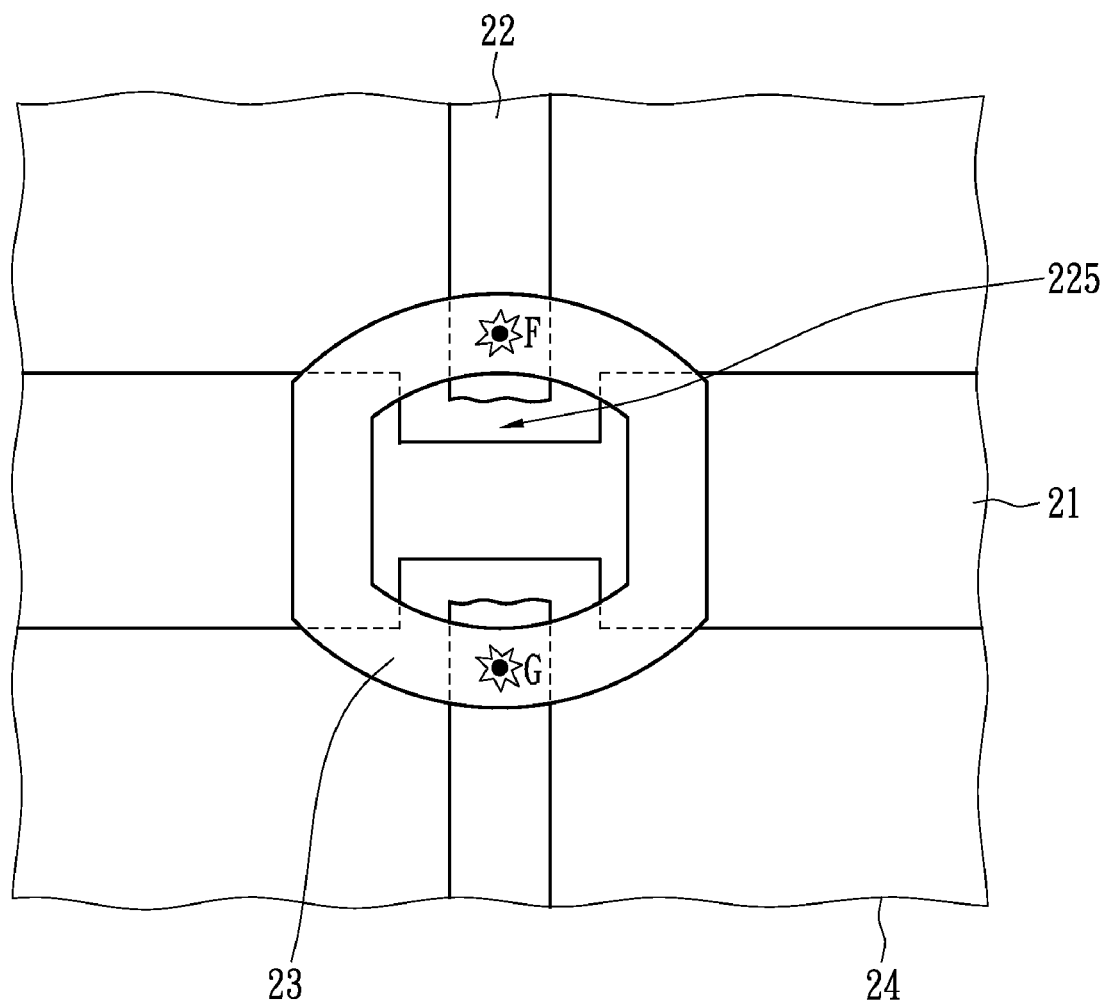
FIGS. 5 and 6 are schematic diagrams showing repairs on open defects through the third lead in accordance with the present invention.
Figure 6:
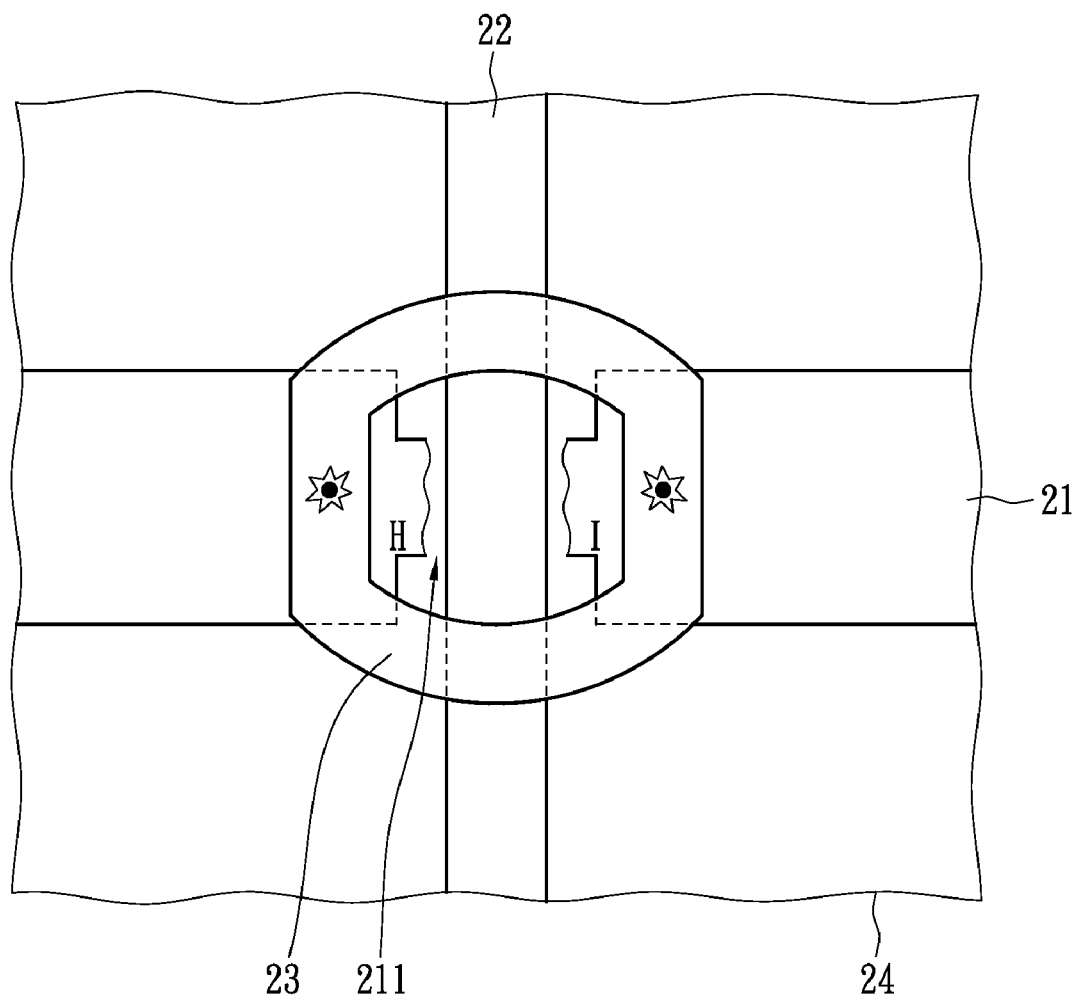

FIGS. 5 and 6 are schematic diagrams showing repairs on open defects through the third lead in accordance with the present invention. When the portion of the second lead 22 in the third lead 23 has an open circuit 225, laser welding can be applied to the point F and G of the third lead 23 so that the third lead 23 and broken second lead 22 are connected each other to form a loop. Consequently, such a short defect can be repaired.

When the first lead 21 has a open circuit 211 in the third lead 23, laser welding can be applied to the point H and I of the third lead 23 so that the third lead 23 and broken first lead 21 are connected each other to form a loop. Consequently, such a short defect can be repaired.

The above-described embodiments of the present invention are intended to be illustrative only. Those skilled in the art may devise numerous alternative embodiments without departing from the scope of the following claims.

What is claimed is:

1. A display apparatus, comprising:
    a substrate;
    a first lead disposed on the substrate;
    a second lead disposed on the substrate and intersecting the first lead at a first overlapping area; and
    a third lead disposed on the substrate and intersecting the first lead at a second overlapping area and a third overlapping area.

2. The display apparatus of claim 1, wherein the first overlapping area is between the second overlapping area and the third overlapping area.

3. The display apparatus of claim 1, further comprising a first insulation material disposed between the first lead and the second lead.

4. The display apparatus of claim 1, wherein the first lead is between the second lead and the substrate.

5. The display apparatus of claim 4, further comprising a second insulation material disposed between the second lead and the third lead.

6. The display apparatus of claim 1, wherein the second lead is between the first lead and the substrate.

7. The display apparatus of claim 1, further comprising a second insulation material disposed between the first lead and the third lead.

8. The display apparatus of claim 1, wherein the width of the first overlapping area is equal to the width of the second overlapping area.

9. The display apparatus of claim 1, wherein the first lead has a shrinking portion.

10. The display apparatus of claim 9, wherein the shrinking portion is located in the first overlapping area.

11. The display apparatus of claim 1, wherein the third lead surrounds the first overlapping area.

12. The display apparatus of claim 1, wherein the third lead is a closed ring-shaped lead.

13. The display apparatus of claim 1, wherein the material of the third lead is a conductive material.

14. The display apparatus of claim 13, wherein the conductive material is an Indium Tin oxide.

15. A repair method for a display apparatus, applied to the display apparatus of claim 1, comprising the steps of:
    electrically isolating the portion of the first lead corresponding to the second overlapping area and the third overlapping area;
    electrically connecting the portion of the third lead corresponding to the second overlapping area to the portion of the first lead corresponding to the second overlapping area; and
    electrically connecting the portion of the third lead corresponding to the third overlapping area to the portion of the first lead corresponding to the third overlapping area;
    whereby the portions of the first lead corresponding to the second overlapping area and third overlapping area electrically connect each other through the third lead.

16. The repair method for a display apparatus of claim 15, further comprising a step of breaking the portion of the first lead between the second overlapping area and the third overlapping area.

17. The repair method for a display apparatus of claim 15, further comprising a step of cutting the portion of the first lead between the first overlapping area and the second overlapping area by laser.

18. The repair method for a display apparatus of claim 15, further comprising a step of cutting the portion of the first lead between the first overlapping area and the third overlapping area by laser.

19. The repair method for a display apparatus of claim 15, further comprising a step of welding the portion of the third lead corresponding to the second overlapping area and the first lead corresponding to the second overlapping area together by laser.

20. The repair method for a display apparatus of claim 15, further comprising a step of welding the portion of the third lead corresponding to the third overlapping area and the first lead corresponding to the third overlapping area together by laser.

* * * * *